UNITED STATES PATENT OFFICE.

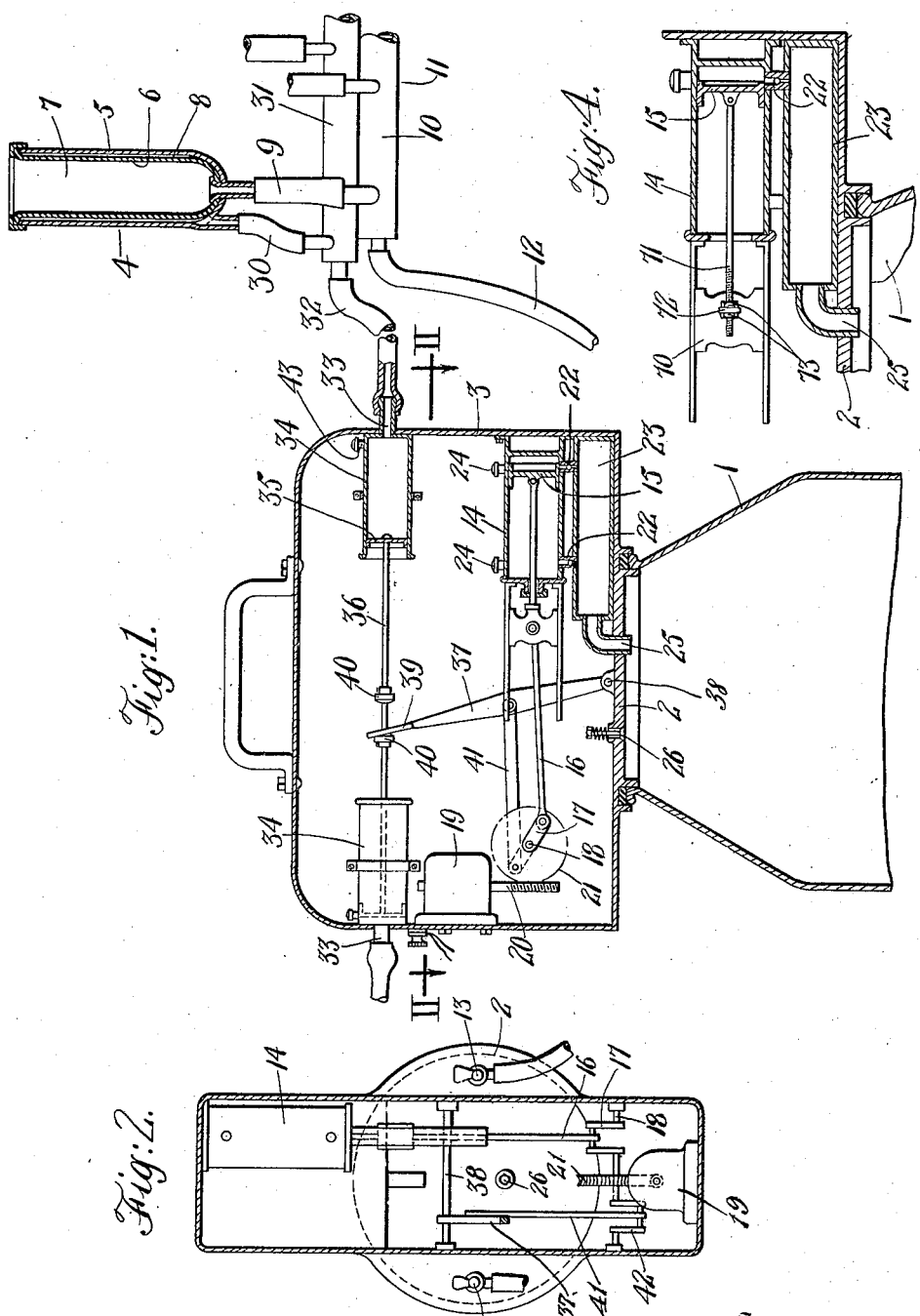

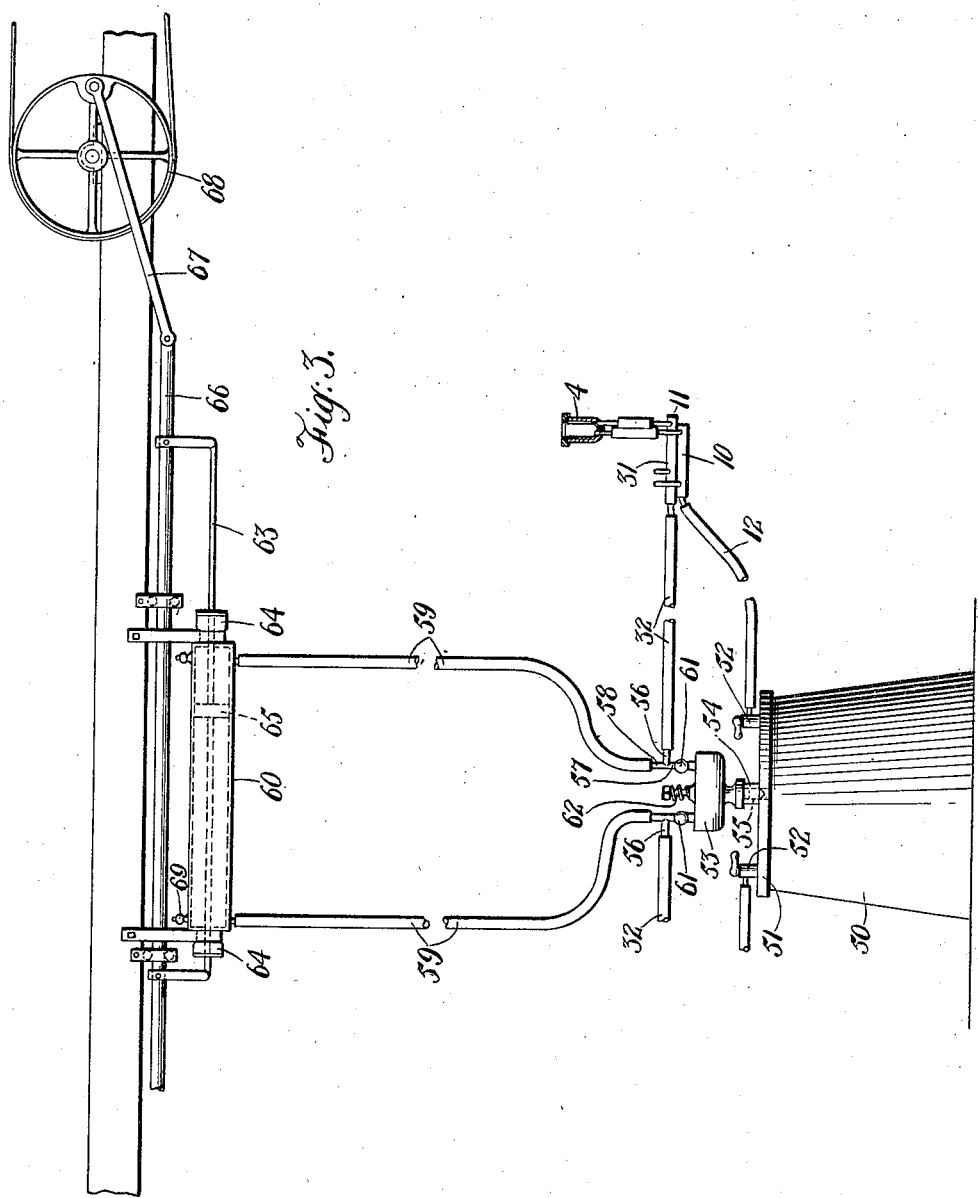

HERBERT A. McARTHUR, OF MONTREAL, QUEBEC, CANADA.

MILKING-MACHINE.

1,351,337.  Specification of Letters Patent.  Patented Aug. 31, 1920.

Application filed June 10, 1918. Serial No. 239,108.

*To all whom it may concern:*

Be it known that I, HERBERT A. McARTHUR, a subject of the King of Great Britain, residing at Montreal, Province of Quebec, Dominion of Canada, have invented certain new and useful Improvements in Milking-Machines, of which the following is a description.

This invention relates to improvements in machinery for milking cows and has for its principal object the production of a machine which will effectively perform the milking operation at a minimum expenditure of power and which at the same time is simple and easy to install, operate and maintain in proper condition.

Most milking machines in use at the present day utilize suction for extracting the milk from the teat, a pulsating action being produced either directly in the teat receiving chamber of the teat cup as in single chambered cup machines, or in a chamber surrounding a flexible teat cup lining, as in double chambered cup machines, the object of the pulsations in either case being to relieve or massage the teat and prevent congestion therein. In both classes of machines, the pulsation action has commonly been produced by the periodic admission of air either at atmospheric or higher pressure to the teat cups and some or all of the other parts of the system. This has resulted in a considerable amount of power being required to operate the machine as after each pulsation the air admitted had to be drawn out by the vacuum producing apparatus. Although the quantity of air admitted at each pulsation is in many cases small, as pulsations occur in the neighborhood of fifty to sixty times a minute, it will be seen that the total amount of air required to be handled is considerable. In accordance with my invention I produce the pulsations by the movement into and out of the teat cups of a confined body of air or other fluid in accordance with the reciprocations of a piston or equivalent means and without admitting any additional air to the system for the purpose of producing pulsations. I furthermore prefer to balance the action of two of the pulsation producing devices against each other, operating the devices to produce plusations alternately in different teat cups or sets of cups whereby the back pressure resulting from the pulsations in one set of cups is utilized to assist in producing the pulsations in the alternate set. As a consequence there is very little loss of power and the capacity of the vacuum producing devices as well as the power utilized in operating the same is reduced to a minimum. My invention, in its preferred form, also contemplates the provision of a self-contained portable apparatus and certain other detail features the nature and specific objects of which will clearly appear from the following description of certain preferred embodiments of my invention which I have chosen to illustrate the principle thereof and the best mode now known to me for performing the same.

In the accompanying drawings in which I illustrate such preferred forms of the invention.

Figure 1 is a diagrammatic view in vertical section illustrating a self-contained milking unit.

Fig. 2 is a horizontal sectional view on line II—II of Fig. 1.

Fig. 3 is a diagrammatic view in side elevation illustrating a modified construction.

Fig. 4 is a view similar to Fig. 1 of a part of a unit, showing another modified construction.

Referring to the drawings in detail and particularly to Figs. 1 and 2, the numeral 1 designates a milk pail adapted to be tightly closed by a lid 2 which in the present instance carries a casing 3 containing the vacuum producing and pulsating devices. 4 is a teat cup illustrated as of a conventional double chambered type comprising an outer casing 5 and a flexible lining 6 of rubber or the like. The interior of the lining 6 constitutes an inner chamber 7 for the reception of the teat while the outer teat cup chamber 8 is inclosed between the lining and casing. The inner chamber 7 communicates by means of a branch pipe 9 with one manifold 10 of a claw 11, this manifold being connected by flexible pipe 12 with a milk cock 13 (see Fig. 2) opening through the lid into the milk pail. The milk passes from this chamber 7 through the connections described directly into the pail. In order to produce a vacuum in the pail which will act through these connections and will draw the milk from the teat, suitable vacuum producing means are provided which in the construction illustrated comprise a small vacuum pump 14 mounted within the casing 3 and having a piston 15 reciprocated by connecting rod 16 attached to a crank 17 on a crank-shaft 18. The crank shaft 18 may be operated in any suitable manner, preferably by a small electric motor 19 mounted within the casing and acting to drive the crank shaft through worm 20 and worm wheel 21. The pump 14 which is illustrated as double acting is provided at its ends with inlet valves 22 through which air is drawn from a chamber 23 as the piston moves back and forth, and with outlet valves 24 through which the air is discharged. The chamber 23 communicates through a suitable connection 25 with the interior of the milk pail so that the air is drawn out of the pail and a partial vacuum maintained therein. A regulating valve 26 is preferably provided on the pail lid so as to prevent the maintenance of an excessive vacuum in the pail. The operation of the pump for a few moments will serve to exhaust the pail to a sufficient degree to draw in the milk and the continued operation of the pump will readily maintain the vacuum and take care of any air brought in with the milk or leaking in around the top of the teat cups.

In order to produce the pulsating action in the outer chambers 8 of the teat cups, these are connected by pipes 30 with the manifold 31 of the claw 11 which is in turn connected by pipe 32 with a nipple 33 opening into a pulsating cylinder 34. Another similar set of teat cups (not shown) is provided, the pulsation chambers of which are connected in a similar manner with the nipple 33 opening into a second pulsation cylinder 34 oppositely disposed with relation to the first cylinder. Pistons 35 connected to a common piston rod 36 reciprocate in these cylinders. Suitable means for reciprocating this rod are provided, the means shown comprising a lever 37 fulcrumed at 38 to the pail lid and having at its upper end a yoke 39 embracing the piston rod and adapted to engage alternately with the adjustable collars 40 mounted on the rod. The lever 37 is oscillated by means of a pitman 41 attached to a crank 42 on the motor driven crank shaft 18. The operation of the motor thus causes the lever to move the piston rod and pistons back and forth in their respective cylinders thereby causing alternate pulsations of pressure and suction in the cylinders and through the connections therefrom to the outer teat cup chambers 8. When one of the pistons 35 is moving away from the outer end of its cylinder it will be seen that suction will be produced which will draw the teat cup lining 6 away from the teat thereby permitting the milk to flow, while when the piston 35 operates in the opposite direction this suction or vacuum will be destroyed and a condition of relative pressure produced, whereby, owing to the vacuum within the inner chamber of the teat cup, the lining will be caused to collapse upon the teat and relieve and massage the same. Owing to the alternate action of the two pistons 35 it will be seen that the atmospheric pressure acting on the back of one of the pistons, for instance, the piston at the right hand side of the casing as shown in Fig. 1, is tending to move this piston in such a direction that the movement thereof will assist in moving the other piston so as to produce the suction on that side of the apparatus. Thus the two pistons tend to balance each other and the power required for their movement is minimized. Furthermore, there is normally no passage of air into or out of the system comprising the pulsator cylinder, the outer teat cup chamber 8 and the connections between the two, this being practically a closed system. There is therefore no expenditure of power in the repeated exhaustion of air from this system but the power needed is simply that required to cause the actual massaging action on the teat. The degree of massaging or pulsating action to which the teat is to be subjected may conveniently be adjusted by varying the length of stroke of the pistons 35. This may be accomplished in any suitable manner, for instance, by the adjustment of the collars 40 so as to permit more or less lost motion between the lever 37 and the piston rod 36. The cylinders 34 are preferably provided with relief means in the form of outwardly opening check valves 43 which prevent the creation of any excess of pressure in the cylinders.

The construction described presents a mechanism requiring very little power for operation thereby among other advantages enabling the apparatus to be driven by an electric or other motor of small proportions. This in turn permits the construction of the apparatus, if desired, as a self-contained unit which may be readily moved from place to place and the only connection with which need be the electric wiring necessary to supply current for the operation of the motor. Thus all vacuum piping, driving rods or similar permanent installations in the cow stable may be dispensed with.

In some cases, however, it may not be desired to constitute the apparatus as a self-contained unit and in Fig. 3 I have shown a modified construction employing certain features of my invention in which a pump is utilized driven by a reciprocating driving rod extending through the cow stable. In accordance with this construction a milk pail 50 is provided on which fits a lid 51 carrying the milk cocks 52 and also carrying a vacuum chamber 53 communicating with the interior of the milk pail through the casing 54 in which is an upwardly opening check valve 55. Two sets of teat cups 4 connected to claws 11 are provided, the milk manifolds 10 of the claws being connected to the milk cocks 52 by the flexible pipes 12. The pulsation manifolds 31 of the claws are connected by pipes 32 to the branches 56 of the Y connections 57, the second-branches 58 of which are connected by flexible pipes 59 with the opposite ends of a pump cylinder 60. The stems of the Y connections 57 are connected to the vacuum chamber 53 through the outwardly opening check valve 61. The vacuum chamber 53 is preferably also provided with the vacuum relief valve 62 which prevents the production of an excessive degree of vacuum in this chamber and in the milk pail and teat cups. Extending through the pump cylinder 60 is a piston rod 63 which passes through stuffing boxes 64 at each end of the cylinder and mounted on this piston rod is a piston 65. The piston rod and piston may be reciprocated in any suitable manner, the means shown for this purpose comprising the drive rod 66 extending through the cow stable and adapted to be reciprocated by a pitman 67 and driving wheel 68. The movement of the piston 65 in one direction will decrease the pressure on one side thereof and increase it on the opposite side in an obvious manner. Back of the piston where the pressure is decreased a partial vacuum is produced which will cause air to be drawn through one of the tubes 58 and through the check valve 61 from the chamber 53 and accordingly from the milk pail. A partial vacuum will thus be produced in the pail which will cause the milk to be drawn from the teats and through the milk passage of the manifold and pipe 12 into the pail. The same movement of the piston 65 will also produce an increase in pressure in front of the piston in the second pipe 59 and through the branch 56 of the second Y connection, pipe 32 and connections, to the outer chambers of the second set of teat cups. This will produce the desired pulsating and massage action in these cups. Any excess of air in the cylinder 60 in front of the piston will be driven out through the appropriate discharge valve 69, one of which is provided at each end of the cylinder. Owing to the presence of the check valves 61 it will be seen that no air can be forced from the cylinder into the chamber 53 and milk pail so that so far as these parts of the apparatus are concerned the pump 60 acts as a vacuum pump while at the same time causing the necessary pulsations in the outer teat cup chambers.

As in the form of my invention previously described it will be seen that the forces acting upon the opposite sides of the piston 65 tend to balance each other and also that there is no admission of air from the outside into the outer teat cup chambers. Thus the power required to operate the apparatus is kept at a minimum as in the previous case and there is no excess of air to be handled by the pump.

In Fig. 4 I have shown a modified construction of suction pump adapted to be utilized in a unit such as shown in Fig. 1, but involving a novel principle of construction and operation which I believe to be applicable in general to the suction producing devices of milking machinery. The object of this construction is to provide suction producing means which can be adjusted to create a substantially definite and predetermined degree of vacuum which will in no case be exceeded. This is important in milking apparatus as an excessive degree of suction may be seriously injurious to the cow. At the same time by my construction of vacuum producing means the necessity for relief valves and permanently attached vacuum gages is obviated. I accomplish the object named by regulating or determining the amount of clearance in the vacuum pump, the degree vacuum which the pump is capable of producing being determined by this clearance. In the particular construction shown in Fig. 4 which illustrates a single acting pump the amount of clearance may be varied by adjusting the initial position of the piston 15. This is accomplished by attaching the piston 15 to the cross-head 70 which is connected to the connecting rod 16 by means of a pair of piston rods 71 screw threaded on their ends and passing through lugs 72 on opposite sides of the cross-head. The adjustable nuts 73 on the rods clamp the lugs 72 and provide for the securing of the piston at the desired distance from the cross-head. In this way the clearance between the piston and cylinder head, when the piston is at the outer limit of its movement, may be adjusted and the amount of vacuum which the pump will produce can thus be predetermined. Fig. 4 illustrates the piston adjusted so as to provide the minimum clearance, and consequently with this adjustment the pump will produce the maximum vacuum of which it is capable. By shortening the rods 71 so as to bring the piston 15 nearer to the cross head 10 the clearance will be increased, and the highest vacuum which the pump will produce will therefore be decreased. The capacity of the pump is preferably made sufficient so that variations in the suction due to such slight leakage as may occur will be negligible.

While I have shown and described in detail certain preferred constructions illustrative of my invention I realize that modifications may be made therein and I do not therefore desire to limit myself to such specific constructions but intend to cover my invention broadly in whatever form its principle may be embodied.

Having thus described my invention what

I claim as new and desire to secure by Letters Patent is:

1. In a milking machine the combination of double chambered teat cups, double acting pumping means acting on one stroke to force fluid pressure into the outer chambers of one cup or group of cups and at the same time create suction in the outer chamber of another teat cup or group of teat cups and on the opposite stroke to reverse such conditions of suction and pressure, and means for applying suction to the inner teat cup chambers.

2. In a milking machine the combination of double chambered teat cups, a pumping system comprising a reciprocating piston and cylinder means adapted to produce pressure in one part of said system and simultaneously produce suction in another part of said system and vice versa, connections between the outer chambers of different teat cups or groups of teat cups and the respective parts of the pumping system, and means for applying suction to the inner teat cup chambers.

3. A portable milking unit comprising a milk pail, a lid therefor, a casing mounted on the lid, a vacuum pump in the casing, a pair of pulsation cylinders in the casing, pistons in the cylinders connected by a common piston rod, a motor in the casing, driving connections from said motor to said vacuum pump and to said piston rod, and groups of double chambered teat cups, the outer chambers of the cups of the respective groups being connected to the respective pulsation cylinders and the inner chambers of the teat cups being connected to discharge into the milk pail.

4. In a milking machine the combination of teat cups, a suction pump and means for determining the degree of suction to be produced by the pump by providing the pump with a definite clearance proportioned to the degree of suction to be produced.

5. In a milking machine the combination of teat cups, a suction pump for producing suction therein and means for varying the clearance of the pump to adjust the degree of suction to be produced.

HERBERT A. McARTHUR.